United States Patent
Hasegawa et al.

(10) Patent No.: US 8,100,033 B2
(45) Date of Patent: Jan. 24, 2012

(54) VEHICLE PEDAL DISPLACEMENT CONTROL STRUCTURE

(75) Inventors: Kazuma Hasegawa, Tokyo (JP); Takashi Ikeda, Tokyo (JP); Takeshi Tomomitsu, Tokyo (JP); Satoru Funabashi, Tokyo (JP); Toyohiko Mouri, Tokyo (JP); Yoshitaka Fukushima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1016 days.

(21) Appl. No.: 11/699,892

(22) Filed: Jan. 30, 2007

(65) Prior Publication Data

US 2007/0175692 A1    Aug. 2, 2007

(30) Foreign Application Priority Data

Jan. 31, 2006  (JP) ................................. 2006-022892

(51) Int. Cl.
*G05G 1/30* (2008.04)
*B60T 7/12* (2006.01)
(52) U.S. Cl. ............. 74/512; 74/560; 180/274; 180/275
(58) Field of Classification Search ............. 74/512–514, 74/522, 560–562; 180/274, 275
See application file for complete search history.

(56) References Cited

U.S. PATENT DOCUMENTS

| | | | | |
|---|---|---|---|---|
| 5,615,749 A * | 4/1997 | Kato | ............................... | 180/274 |
| 6,006,626 A * | 12/1999 | Notake et al. | .................... | 74/512 |
| 6,880,665 B2 * | 4/2005 | Oprisch | ........................ | 180/274 |
| 7,398,708 B2 | 7/2008 | Harashima et al. | | |
| 7,690,279 B2 * | 4/2010 | Himetani | ......................... | 74/512 |

FOREIGN PATENT DOCUMENTS

| | | |
|---|---|---|
| EP | 0 810 124 A | 12/1997 |
| EP | 1 479 577 | 11/2004 |
| EP | 1 512 586 A | 3/2005 |
| EP | 1 512 596 A | 3/2005 |
| JP | 10-250624 | 9/1998 |
| JP | 10-264859 | 10/1998 |
| JP | 2005-81910 | 3/2005 |

* cited by examiner

*Primary Examiner* — James Pilkington
(74) *Attorney, Agent, or Firm* — Smith, Gambrell & Russell, LLP

(57) ABSTRACT

A vehicle pedal displacement control structure, which is capable of causing a vehicle pedal to displace so as to turn aside from driver's lower extremities and of reducing load on a steering support member in the event of an external force being applied to the front of the vehicle, is provided. A protrusion and a slide member are provided between the steering support member and a pedal bracket for suspending the vehicle pedal. When the pedal bracket moves backward with a toe board due to the external force from the front of the vehicle, the vehicle pedal and the pedal bracket are guided to turn aside from driver's lower extremities in a width direction of vehicle.

22 Claims, 8 Drawing Sheets

VEHICLE PEDAL DISPLACEMENT CONTROL STRUCTURE

BACKGROUND OF THE PRESENT INVENTION

This invention relates to a displacement control structure for suspended vehicle pedals such as parking pedals, accelerator pedals, clutchpedals, and brakepedals. In particular, the present invention relates to a vehicle pedal displacement control structure which reduces risk factors for lower extremity injury to the driver by controlling the displacement of the vehicle pedal in the event of an external force being applied to the front of the vehicle.

The present application claims priority from Japanese Patent Application No. 2006-022892, the disclosure of which is incorporated herein by reference.

One conventional vehicle pedal displacement control structure of this type is shown in FIG. 10. A reinforcement member (steering support beam or instrument panel reinforcement) 2 bridged across a vehicle body at the back of a brake pedal 1 is provided with a pressing member 3. A regulating block 4 is provided on the brake pedal 1 for restricting displacement of the brake pedal 1 relative to the pressing member 3 at the contact point when pressure is applied from the pressing member 3 to the brake pedal 1.

When an external force is applied to the front of the vehicle, a dashboard panel 6 displaces backward, and since a pedal bracket 5 is secured to the panel 6, the brake pedal 1 also moves backward. The pressing member 3 and the regulating block 4 then cooperatively apply pressure to the brake pedal 1 toward the front of the vehicle around a rotation axis 7 so that a pedal pad 8 of the brake pedal 1 moves forward, thereby reducing the risk factors for lower extremity injury to the driver (see, for example, Japanese Unexamined Patent Application Publication No. JP 10-250624).

In this conventional vehicle pedal displacement control structure, the reinforcement member 2, which is primarily provided for supporting and enhancing rigidity of the steering system, is provided with the pressing member 3 to press the regulating block 4 on the brake pedal 1 so as to press the brake pedal 1 toward the front of the vehicle around the rotation axis 7. A problem with this structure is that the reinforcement member 2 is apt to deform because of the load applied thereto, which will make the steering system askew and adversely affect the direction in which an air bag will extend. Furthermore, despite the regulating block 4 provided on the brake pedal 1, the brake pedal 1 will still displace unpredictably because it is dependent on the movement of the dashboard panel 6.

SUMMARY OF THE PRESENT INVENTION

In view of these problems encountered by the conventional techniques, it is an object of the present invention to provide a vehicle pedal displacement control structure capable of causing the vehicle pedal to stably displace in a desired manner and of reducing load on the steering support member in the event of an external force being applied to the front of the vehicle.

To achieve the above object, one aspect of the present invention provides a vehicle pedal displacement control structure having a partition member as a portion of a vehicle body and a reinforcement member for supporting rigidity of a steering system to a vehicle. The reinforcement member is arranged in a vehicle compartment on rearward of the partition member. The vehicle pedal displacement control structure comprises a pedal support member secured to the partition member for pivotally suspending a vehicle pedal, a protrusion arranged at a rear end of the pedal support member and being opposed to the reinforcement member, and a slide member for sliding the protrusion with abutment thereon when the pedal support member moves backward, the slide member being arranged opposing to the protrusion and secured to the reinforcement member.

In the vehicle pedal displacement control structure, the protrusion and the slide member cooperatively guide the pedal support member in a width direction of the vehicle to turn aside from driver's lower extremities when the pedal support member moves backward due to a load applied to the partition member from the front of the vehicle.

According to the aspect of the present invention, when the pedal support member moves backward with the partition member on the driver's seat side because of an external force applied to the front of the vehicle, the pedal support member is guided in the width direction of the vehicle by the cooperating action of the protrusion and the slide member so as to turn aside from the driver's lower extremities in a sliding manner. This reduces risk factors for lower extremity injury to the driver as well as reducing the load on the reinforcement member. Therefore, the reinforcement member can maintain its rigidity for supporting the steering system, and situations are avoided where the steering system becomes askew or the direction in which the air bag extends is adversely affected.

According to another aspect of the present invention, in the abovementioned aspect, at least one of the opposing surfaces of the protrusion and the slide member is rounded off.

With this aspect, when the protrusion abuts on the slide member, the protrusion moves smoothly in the width direction of the vehicle to turn aside from the driver's lower extremities without being caught on any part of the slide member. In addition to the effects mentioned above, this ensures the movement of the pedal pad of the vehicle pedal to smoothly turn aside from the driver's lower extremities, as well as reduces the load applied to the reinforcement member when the protrusion abuts on the slide member.

According to still further aspect of the present invention, in any of the abovementioned aspects, the protrusion and the slide member are provided with a slope for guiding the pedal support member to turn a side from the driver's lower extremities as the pedal support member moves backward.

Therefore, the pedal support member is guided in the width direction of the vehicle to turn aside from the driver's lower extremities as it moves backward by the slopes formed on the protrusion and the slide member. In addition to the effects mentioned above, this can enhance the smoothness and stability with which the pedal pad of the vehicle pedal turns aside from the driver's lower extremities, and thereby reduce the load applied to the reinforcement member.

According to still another aspect of the present invention, an attachment member is provided between the partition member and the pedal support member so as to attach and support the pedal support member on the partition member. The attachment member includes a bent portion deformed in the width direction of the vehicle for the pedal support member to turn aside from driver's lower extremities when the pedal support member moves backward due to a load applied to the partition member from the front of the vehicle.

In this instance, as the pedal support member moves backward of the vehicle, the attachment member provided between the partition member and the pedal support member deforms to turn aside from the driver's lower extremities. This ensures the pedal support member to be further turned off from the driver's lower extremities. Therefore, in addition to the effects mentioned above, it is ensured that the load on the reinforcement member is further reduced.

According to still another aspect of the present invention, in the abovementioned aspect, two or more such attachment members are provided and spaced apart from each other vertically, and the ones in a higher position have lower strength for supporting the pedal support member than the ones in a lower position.

When the pedal support member moves backward and transversely, the attachment members cause the upper part of the pedal support member to further move in the direction of turning aside from the driver's lower extremities. Therefore, in addition to the effects mentioned above, this can further reduce the load on the reinforcement member when the pedal support member is moved to turn aside from the driver's lower extremities.

According to the vehicle pedal displacement control structure of the present invention, when the pedal support member moves backward with the partition member on the driver's seat side in the event of an external force being applied to the front of the vehicle, the pedal support member is guided to turn aside from the driver's lower extremities by the protrusion and the slide member provided between the opposing surfaces of the vehicle reinforcement member and the pedal support member, so that the pedal pad of the vehicle pedal can be moved so as to turn aside from the driver's lower extremities. This can reduce the load on the steering support member and cause the vehicle pedal to stably turn aside from the driver's lower extremities in the event of an external force being applied to the front of the vehicle.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Preferred embodiments of the present invention will be hereinafter described in detail with reference to FIG. 1 to FIG. 9.

Figure 1:
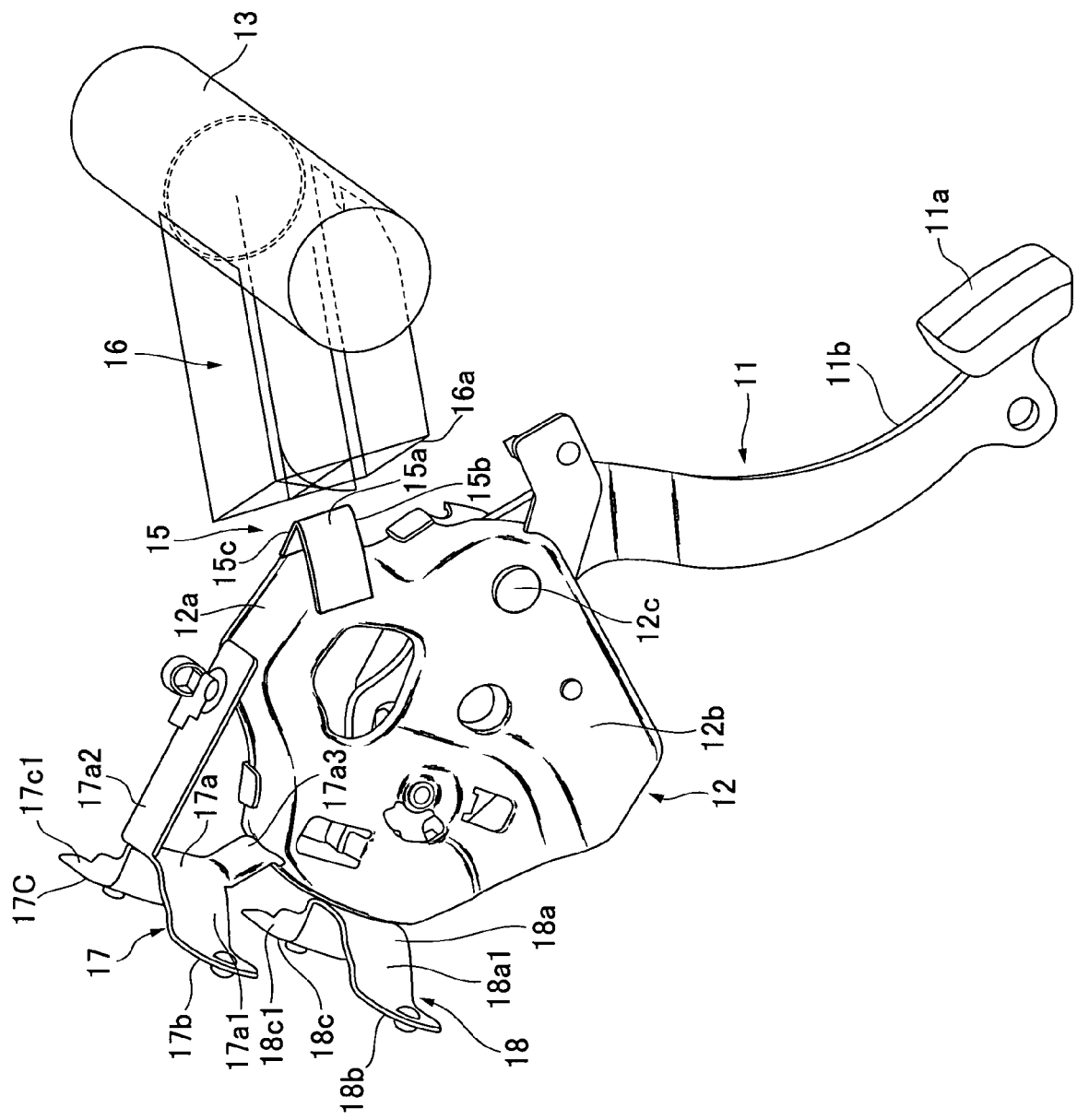
FIG. 1 is a schematic perspective view of a parking pedal provided with one embodiment of the vehicle pedal displacement control structure of the present invention.
Figure 2:
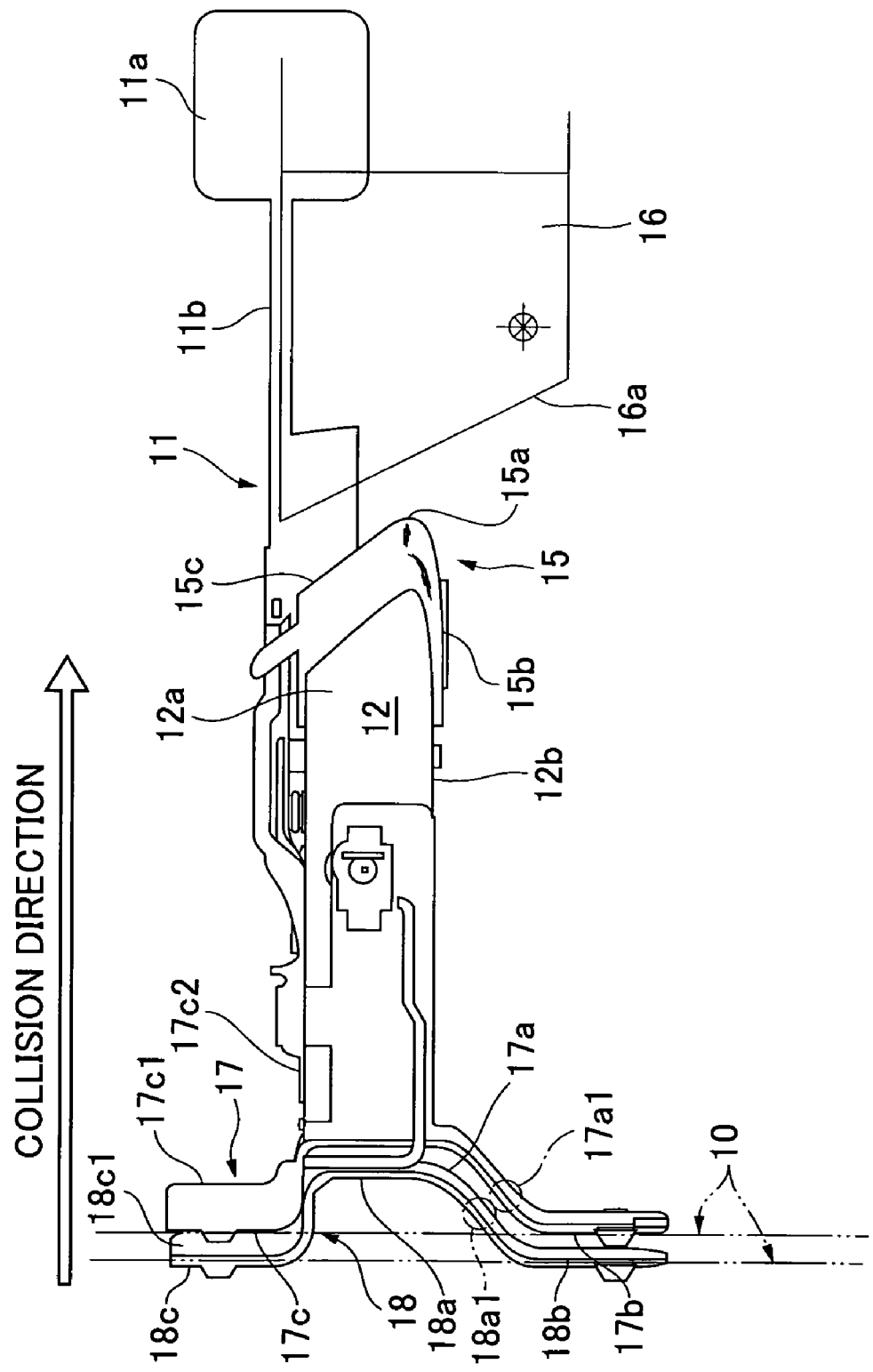
FIG. 2 is a plan view of FIG. 1.
Figure 3:
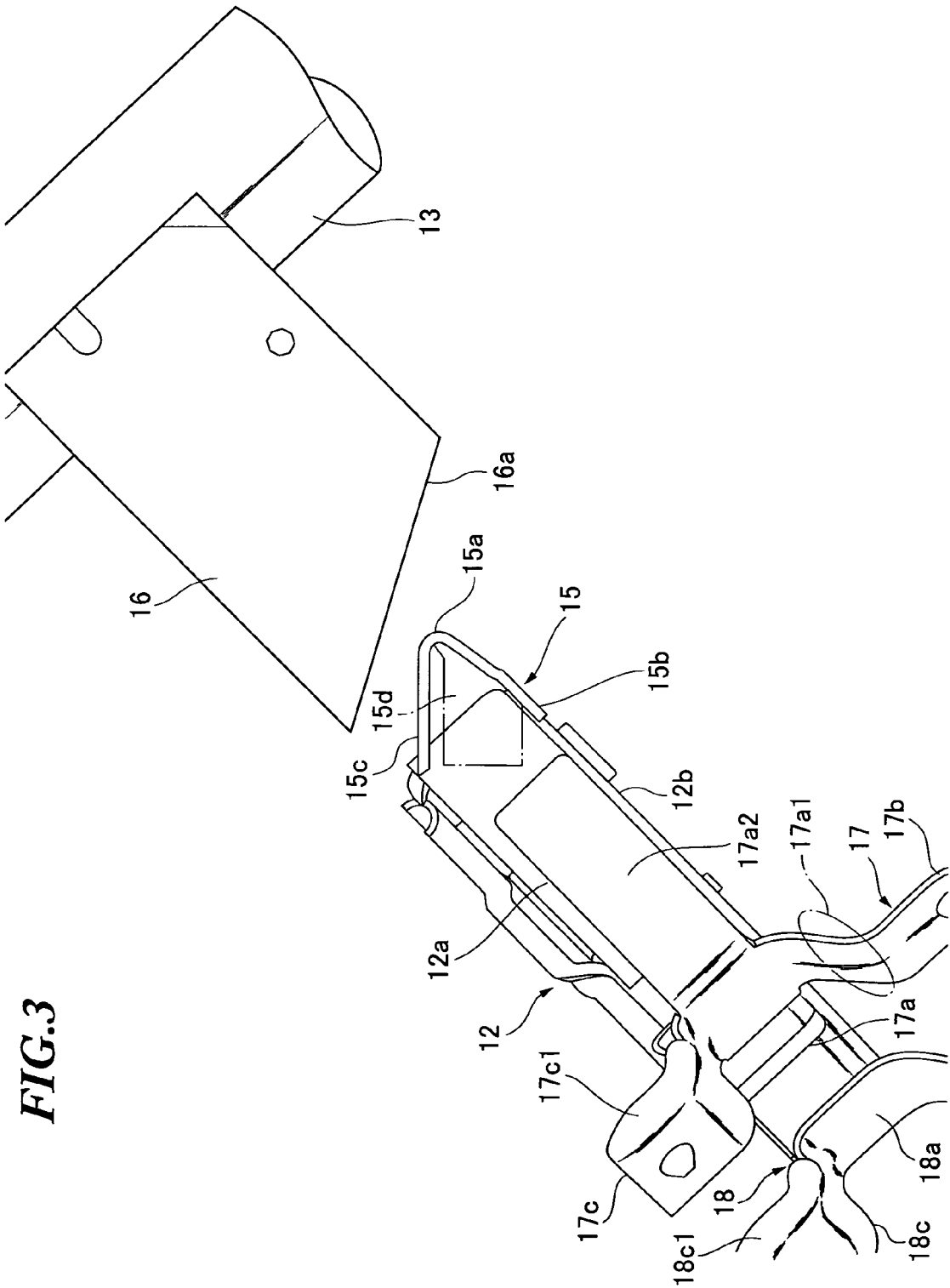
FIG. 3 is an enlarged plan view of relevant parts of FIG. 1.
Figure 4:
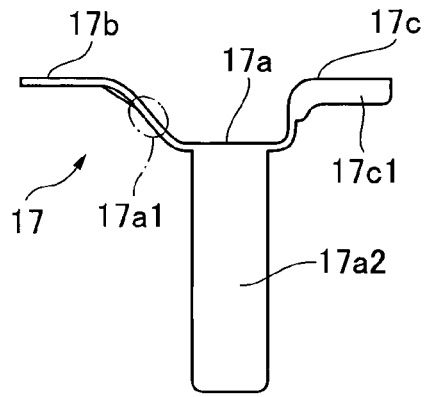
FIG. 4A is a plan view of an upper attachment bracket.
FIG. 4B is a front view of FIG. 4A.
Figure 4:
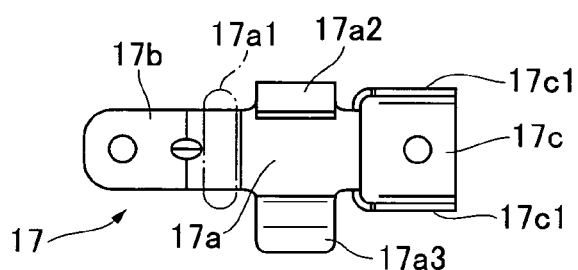
Figure 5:
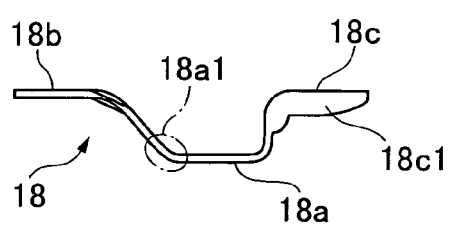
FIG. 5A is a plan view of a lower attachment bracket.
FIG. 5B is a front view of FIG. 5A.
Figure 5:
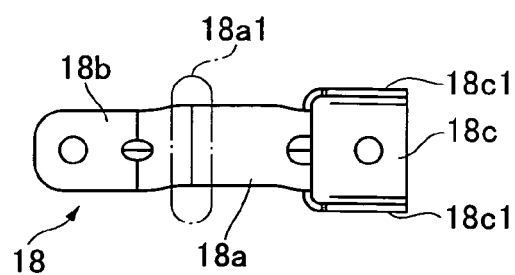

First, the structure of a suspended parking pedal provided with a vehicle pedal displacement control structure will be generally described. The parking pedal is one example of pedals provided with the vehicle pedal displacement control structure, and also that of a right-hand drive car, which is located at an innermost of vehicles pedals, i.e., left end, will be described as one embodiment of the present invention hereinafter. As shown in FIG. 1 to FIG. 3, a pedal bracket 12 or a pedal support member for pivotally suspending a parking pedal 11 is attached to a toe board 10 or a partition member (FIG. 2) on the driver's seat side. On the rearward side of this pedal bracket 12, a steering support beam 13, which is a high strength pipe member, is bridged across the vehicle as a reinforcement member for the support and reinforcement of the steering system and instrument panel. A protrusion 15 is formed on the pedal bracket 12 so as to be arranged between the opposing surfaces of the pedal bracket 12 and the steering support beam 13. The protrusion 15 is provided so as to cause a pedal pad 11a on the parking pedal 11 to move inward of the vehicle body in the width direction thereof, i.e., toward the instrument panel 14 in the center of the vehicle, using deformation of the vehicle body in the event of a collision. A slide bracket 16 or a slide member is provided to the steering support beam 13 so that the protrusion 15 will make sliding contact with it.

More specifically, two attachment brackets 17 and 18, which are spaced apart from each other vertically, are provided between the toe board 10 and the pedal bracket 12. As shown in FIGS. 4A, 4B, 5A and 5B, these upper and lower attachment brackets 17 and 18 are used for attaching the parking pedal and are formed in a hat shape in plan view so that they will bend when the toe board 10 is moved backward by an external force applied to the front of the vehicle. The brackets 17 and 18 consist of center protrusions (or portions) 17a and 18a and pairs of left and right bent flanges (or first and second supporting portions) 17b, 17c, 18b, 18c on both sides extending widthwise of the vehicle and securely fastened to the toe board 10 with bolts.

Between the center protrusions 17a and 18a and the flanges 17c and 18c on the outer side of the upper and lower attachment brackets 17 and 18 are integrally formed pairs of upper and lower ribs 17c1 and 18c1 which extend diagonally backward, so that the brackets have a higher strength (section modulus) on the side which faces the outer side of the vehicle. On the other side of the brackets 17 and 18, i.e., between the center protrusions 17a and 18a and the flanges 17b and 18b on the inner side are formed mildly curved bent portions 17a1 and 18a1, so that the bracket shave a lower strength on the inner side than the outer side of the vehicle in the width direction thereof.

Connecting joints 17a2 and 17a3 extend backwardly from the upper and lower ends of the center protrusion 17a of the upper attachment bracket 17, their distal ends being securely fastened to the upper face 12a of the pedal bracket 12 by a fastener such as a weld. The upper connecting joint 17a2 is longer than the lower connecting joint 17a3. The lower attachment bracket 18, conversely, is securely fastened to the upper face 12a of the pedal bracket 12 directly in the center protrusion 18a by welding. This means that the pedal bracket 12 has lower supporting rigidity in the upper part.

With the above-described structure, when an external force is applied to the front of the vehicle and the toe board 10 moves backward, the brackets 17 and 18 will buckle more easily on the inner side by an inwardly acting force, and the upper part of the pedal bracket 12 is deformed more to the inner side of the vehicle in the width direction thereof.

The pedal bracket 12 has a substantially square U-shaped cross section with the open end downwards as shown in FIG. 1, consisting of a pair of left and right side walls 12b, 12b and the upper face 12a which connects the upper ends of the side walls 12b, 12b and forms the attachment surface for the upper and lower attachment brackets 17 and 18. The parking pedal 11 is suspended between the left and right side walls 12b, 12b of the pedal bracket 12 in a pivotal manner, through a pivot 12c thereon.

The parking pedal 11 includes a suitably curved pedal support 11b which extends vertically, and the pedal pad 11a which forms a foot pressure surface at the lower end of the pedal support 11b. Between the pedal support 11b and the pedal bracket 12 is provided a return spring (not shown) which presses the parking pedal 11 back to its initial position whenever the pedal is moved. A cable from the parking brake drum or the like is connected to the pedal support 11b, so that when pressure is applied to the parking pedal 11 to operate the parking brake, a drum shoe is pressed against the brake drum through the cable.

The protrusion 15, which is substantially triangular in top view and extends towards the vehicle rear, is securely fastened to the pedal bracket 12 opposite the steering support beam 13. This protrusion 15 is somewhat offset toward the inner side of the vehicle in the width direction thereof so that a rearward protruding end 15a is arranged on the inner side of the pedal bracket 12, where its rigidity is lower (or, in other words, is offset relative to central vertical plane VP shown in FIG. 8). The rearward protruding end 15a is not V-shaped but rather U-shaped, i.e., it has no sharp ends and is rounded all over. A slope 15c is formed between the rearward protruding end 15a and the right side wall 12c (outer side of the vehicle) of the pedal bracket 12 and securely fastened to the right side wall 12c, for guiding the pedal bracket 12 diagonally toward the inner side of the vehicle in the width direction thereof when the pedal bracket 12 is moved backward by the external force applied to the front of the vehicle. Conversely, between the rearward protruding end 15a and the left side wall 12b (inner side of the vehicle) of the pedal bracket 12 there is formed a side part 15b which extends substantially straight in the front to back direction of the vehicle and is securely fastened to the left side wall 12b of the pedal bracket 12.

Figure 6A:
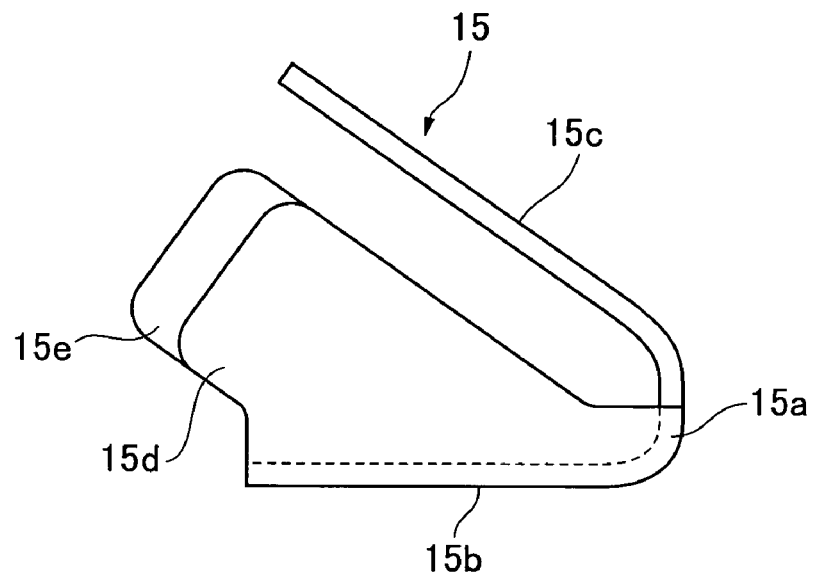
FIG. 6A is a plan view of the protrusion.
Figure 6B:
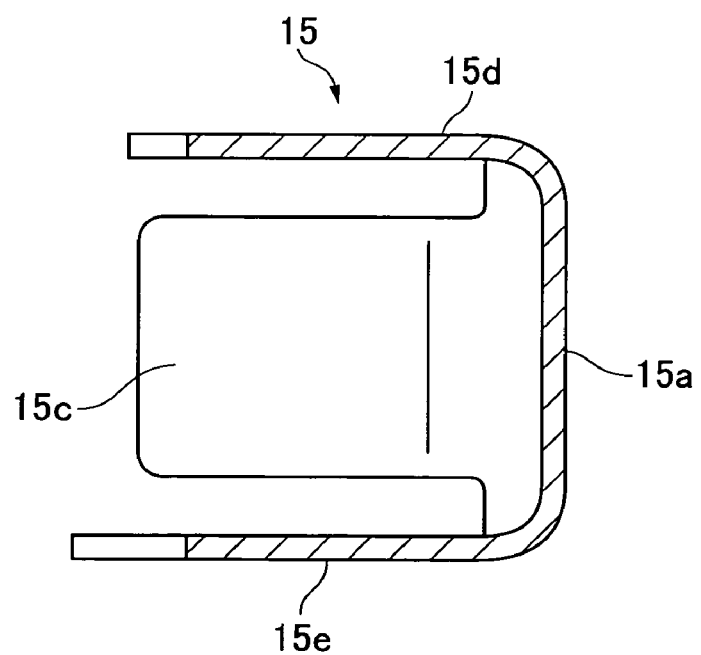
FIG. 6B is a cross sectional view of the protrusion.

In a preferred embodiment, the protrusion 15 may include flanges 15d and 15e extending from the side part 15b to the pedal bracket 12 as indicated by the dot-dash line in FIG. 3 or shown in FIG. 6A and FIG. 6B. By securely fastening these flanges 15d and 15e to the pedal bracket 12, the protrusion 15 can be given a higher rigidity on the inner side of the vehicle in the width direction thereof. With this structure, when the protrusion 15 makes contact with the slide bracket 16, the protrusion 15 is biased toward the inner side of the vehicle in the width direction thereof together with the pedal bracket 12.

Figure 9:
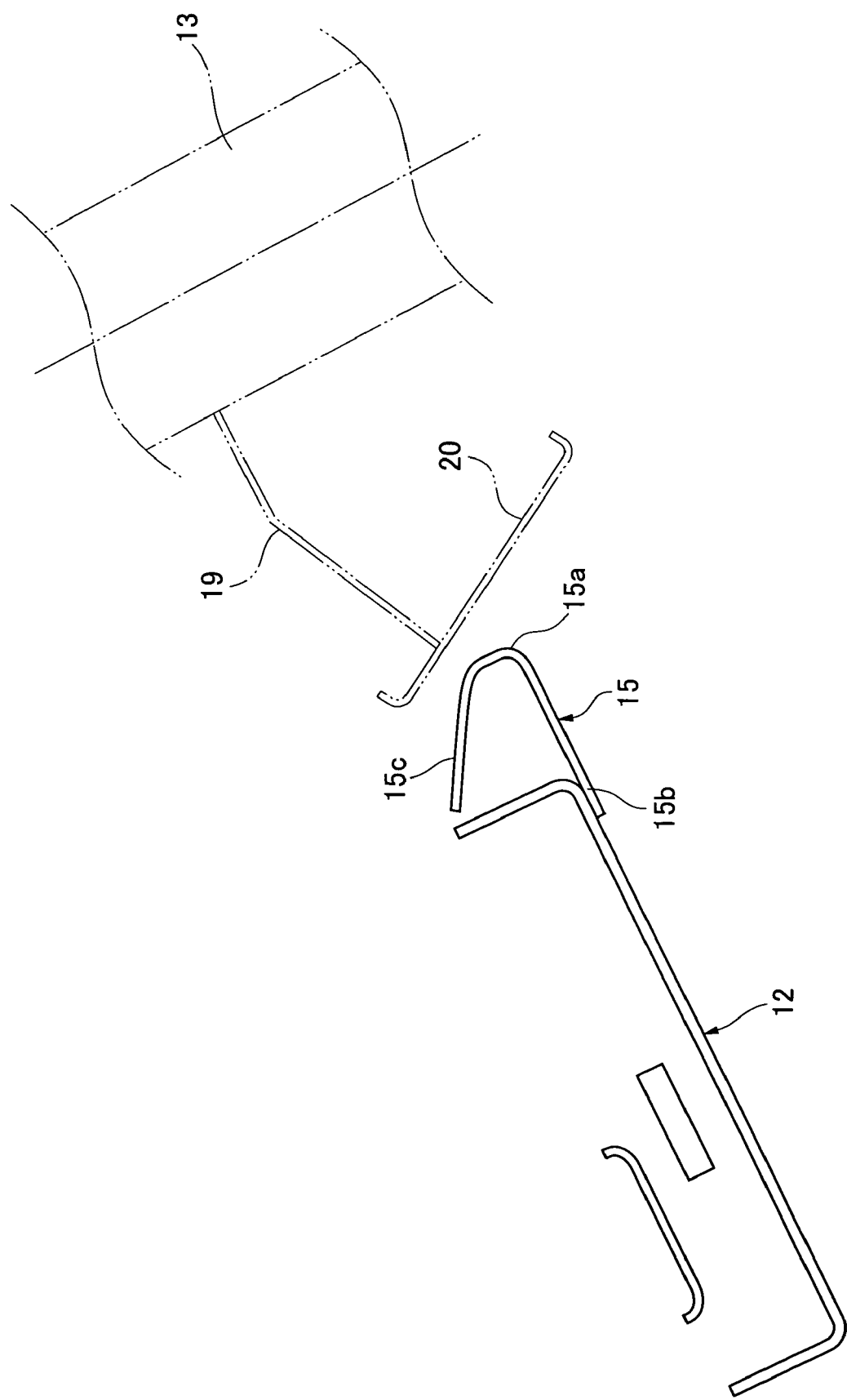
FIG. 9 is a cross sectional view of a pedal bracket and a slide bracket.
Figure 10:
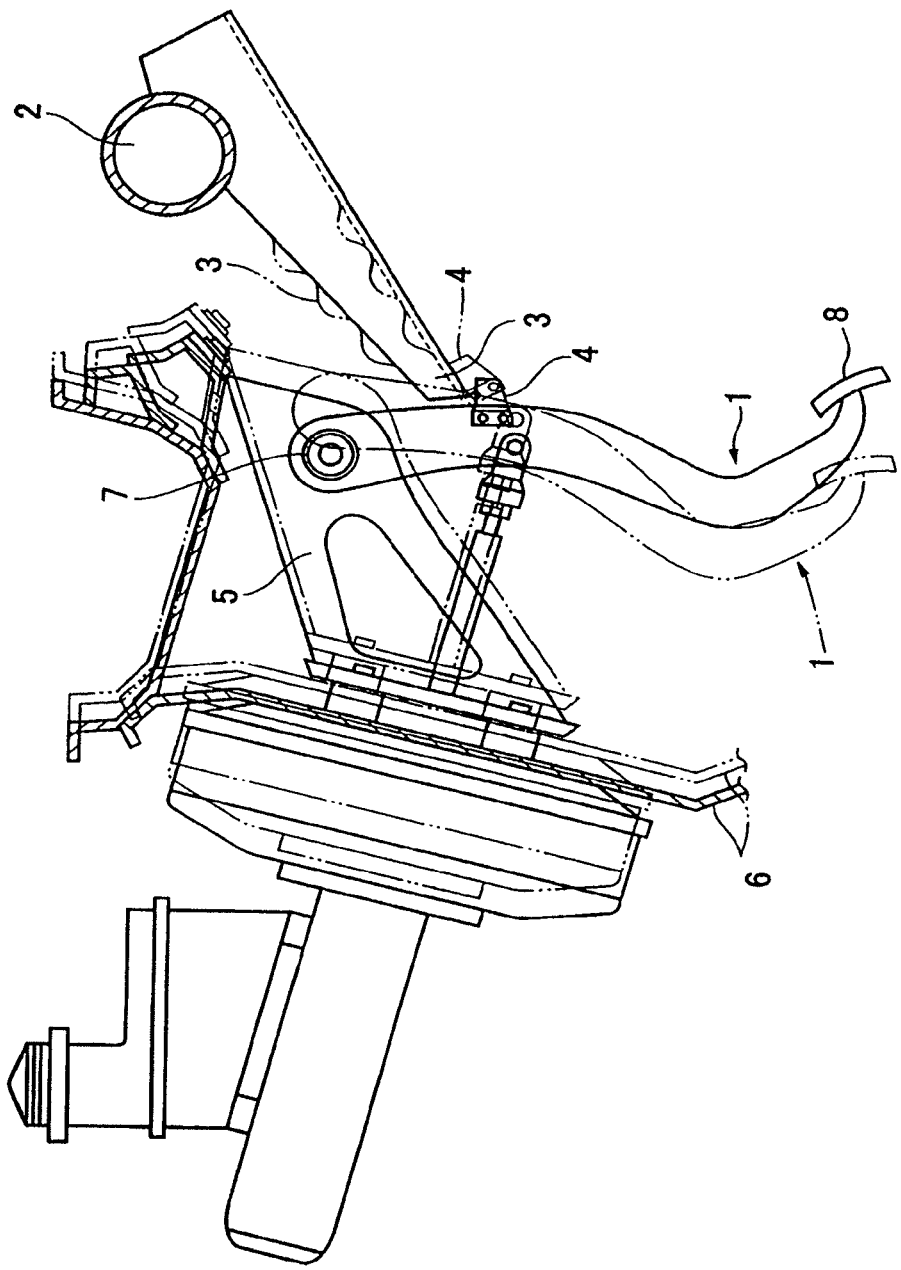
FIG. 10 is a schematic side view of a conventional vehicle pedal displacement control structure.

The slide bracket 16 is fastened to the front face of the steering support beam 13 which is arranged substantially behind the protrusion 15. A front surface 16a of the slide bracket 16 is inclined relative to the slope 15c of the protrusion 15 or rounded so that the protrusion 15, which comes into contact with the front surface 16a first when it moves backward, is guided toward the inner side of the vehicle in a sliding manner without being caught. The slide bracket 16 can have a box structure as shown in FIG. 1 to FIG. 3, or any other shape which can cause the protrusion 15 to move toward the inner side of the vehicle in the width direction thereof in a sliding manner as it moves backward. For example, the slide bracket may consist of an arm 19 and a guide plate 20 as shown in FIG. 9, the arm 19 extending from the steering support beam 13 toward the protrusion 15 with its distal end bent inward of the vehicle in the width direction thereof, and the guide plate 20 being supported on the arm 19 diagonally toward the inner side of the vehicle in the same manner.

When the toe board 10 moves backward because of an external force applied to the front of the vehicle, the protrusion 15 and the slide bracket 16 cooperate with each other and cause the pedal bracket 12 to move backward in the intended direction, i.e., toward the inner side of the vehicle in the width direction thereof in a sliding manner, to ensure that the pedal pad 11a is moved away from the lower extremities of the driver. Moreover, this structure causes the pedal bracket 12 to move backward and inward of the vehicle in the same attitude. Furthermore, the slip resistance between the protrusion 15 and the slide bracket 16 when the toe board 10 moves backward due to the external force will be less, and as a result the load on the steering support beam 13 is reduced. Further, as seen from the solid and dashed lines for pedal pad 11a, the pedal support and the attachment member are configured such that, during a course of cooperation between the protrusion and the slide member, a lower free end of vehicle pedal moves only rearward, relative to a front to rear axis, in combination with the width direction movement of the pedal support.

Next, the operation of this vehicle pedal displacement control structure will be described.

Figure 7:
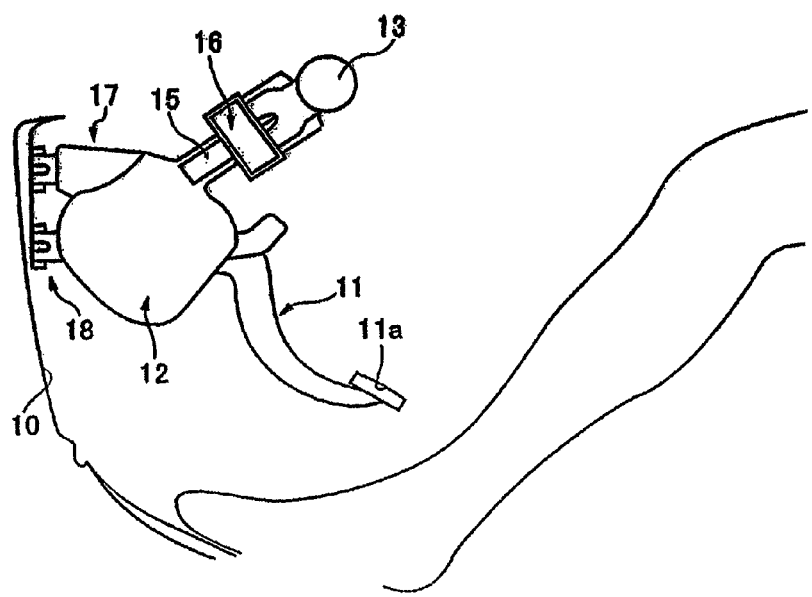
FIG. 7 is a schematic side view illustrating the operation of the vehicle pedal displacement control structure.
Figure 8:
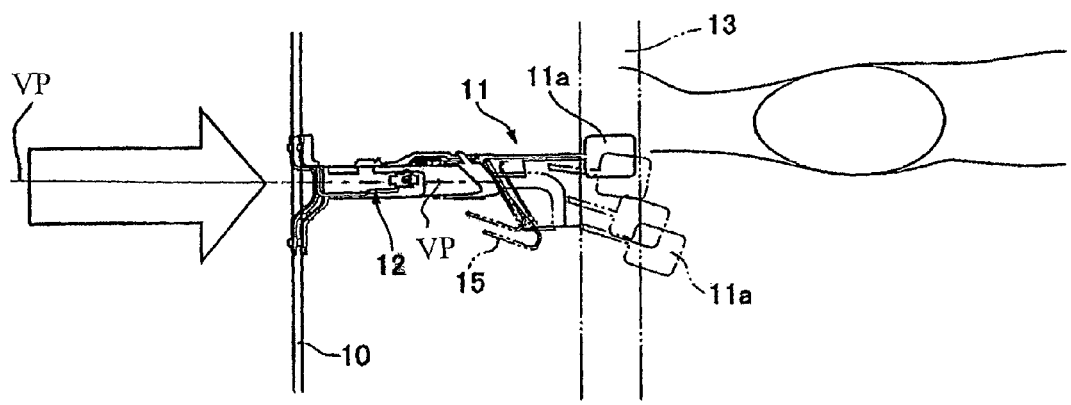
FIG. 8 is a schematic plan view illustrating the operation of the vehicle pedal displacement control structure.

When the toe board 10 moves backward because of an external force applied to the front of the vehicle, the pedal bracket 12 moves backward with the toe board 10. As soon as the rearward protruding end 15a of the protrusion 15 on the pedal bracket 12 makes contact with the front surface 16a of the slide bracket 16 on the steering support beam 13, the pedal bracket 12 is guided toward the inner side of the vehicle in the width direction thereof as shown in FIGS. 1, 7 and 8. With the slope 15c of the protrusion 15 moving in sliding contact with the front surface 16a of the slide bracket 16, the pedal bracket 12 moves back diagonally toward the inner side of the vehicle without being offset.

Furthermore, as the pedal bracket 12 moves diagonally toward the inner side of the vehicle, the upper and lower attachment brackets 17 and 18 buckle on their inner side because they are weaker than the inwardly acting force.

By thus guiding the pedal bracket 12 inward of the vehicle in a sliding manner when it moves backward with the toe board 10 in the event of an external force being applied to the front of the vehicle, the pedal bracket 12 is moved in the intended direction, i.e., the pedal pad 11a is moved away from the lower extremities of the driver, thereby reducing the risk factors for lower extremity injury to the driver. Moreover, because the upper part of the pedal bracket 12 is deformed and moved more toward the inner side of the vehicle, the load applied to the steering support beam 13 when the protrusion 15 moves in sliding contact with the slide bracket 16 is reduced.

As described above, according to the vehicle pedal displacement control structure of the present invention, when the pedal bracket 12 moves backward with the toe board 10 because of an external force applied to the front of the vehicle, the pedal bracket 12 is guided toward the inner side of the vehicle in the width direction thereof in a sliding manner so that the pedal pad 11a of the parking pedal 11 is moved into the instrument panel 14 on the inner side of the vehicle by the cooperating action of the protrusion 15 and the slide bracket 16. This reduces risk factors for lower extremity injury to the driver as well as reducing the load on the steering support beam 13. Therefore, the steering support beam 13 can maintain its rigidity for supporting the steering system, and situations are avoided where the steering system becomes askew or the direction in which the air bag extends is adversely affected.

According to the present invention, at least one of the opposing surfaces of the protrusion 15 and the slide bracket 16 is rounded so that, when the protrusion 15 makes contact with the slide bracket 16, the protrusion 15 moves smoothly toward the inner side of the vehicle without being caught on any part of the slide bracket 16. This ensures smooth movement of the pedal pad 11a of the parking pedal 11 toward the inner side of the vehicle in the width direction thereof, as well as reduces the load applied to the steering support beam 13 when the protrusion 15 abuts on the slide bracket 16.

Moreover, according to the present invention, the pedal bracket 12 is guided toward the inner side of the vehicle in the width direction thereof as it moves backward because of the slope 15c and the front surface 16a formed on the protrusion 15 and the slide bracket 16, respectively. This can enhance the smoothness and stability with which the pedal pad 11a of the parking pedal 11 moves toward the inner side of the vehicle in the width direction thereof, and reduce the load applied to the steering support beam 13 when the pedal bracket 12 is moving inward of the vehicle.

Furthermore, according to the present invention, as the pedal bracket 12 moves backward and inward of the vehicle, the upper and lower attachment brackets 17 and 18 provided between the toe board 10 and the pedal bracket 12 buckle on the inner side of the vehicle in the width direction thereof. This causes the pedal bracket 12 to move further toward the inner side, ensuring that the pedal pad 11a of the parking pedal 11 moves into the instrument panel 14 on the inner side of the vehicle in the width direction thereof, thereby reducing the risk factors for lower extremity injury to the driver, and the load on the steering support beam 13 is reduced.

According to the present invention, when the pedal bracket 12 moves backward toward the inner side of the vehicle in the width direction thereof, the upper and lower attachment brackets 17 and 18 cause the upper side of the pedal bracket 12 to move more easily toward the inner side of the vehicle. This can further reduce the load on the steering support beam 13 when the pedal bracket 12 is moving toward the inner side of the vehicle.

The present invention is applicable not only to parking pedals but also to other suspended vehicle pedals such as accelerator pedals, clutch pedals, and brake pedals.

Moreover, in the case of the accelerator pedal in a right-hand drive car, which is located at an outermost of vehicle's pedals, i.e., right end, the accelerator pedal and the pedal bracket are moved toward the outer side of the vehicle in the width direction thereof, i.e., door side, when an external force is applied to the front of the vehicle, so that they can be moved away from the lower extremities of the driver, thereby reducing the risk factors for lower extremity injury to the driver. That is, the respective directions of movement are adverse with each other between the parking pedal and the accelerator pedal although the purpose of movement is identical with each other.

In addition, in the case of a left-hand drive car to which the present invention is applied, each movement of the respective pedals is adverse to that of the right-hand drive car.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A vehicle pedal displacement control structure having a partition member as a portion of a vehicle body and a reinforcement member for supporting rigidity of a steering system to a vehicle, the reinforcement member being arranged in a vehicle compartment rearward of the partition member, comprising:

a pedal support member for pivotally suspending a vehicle pedal;

an attachment member that has a first end secured to the partition member and a second end secured to the pedal support member so as to attach and support the pedal support member on the partition member;

a protrusion arranged at a rear end of the pedal support member and being opposed to the reinforcement member; and a slide member for sliding the protrusion with abutment thereon when the pedal support member moves backward, the slide member being arranged opposing to the protrusion and secured to the reinforcement member, wherein the attachment member has a lower strength portion on one side than the other side in the width direction of the vehicle such that the attachment member buckles at the lower strength portion and the protrusion and the slide member cooperatively guide the pedal support member away from a driver in a width direction of the vehicle so as to turn aside the pedal support member from the driver's lower extremities when the pedal support member moves backward due to a load applied to the partition member from the front of the vehicle, and wherein the pedal support member and the pivotally suspended vehicle pedal move backward and widthwise together as a unit during a course of cooperation between the protrusion and the slide member.

2. The vehicle pedal displacement control structure according to claim 1, wherein at least one of opposing surfaces of the protrusion and the slide member is rounded off.

3. The vehicle pedal displacement control structure according to claim 1, wherein the protrusion and the slide member are provided with a slope for guiding the pedal support member in the width direction of the vehicle to turn aside from the driver's lower extremities when the pedal support member moves backward.

4. The vehicle pedal displacement control structure according to claim 1, wherein the attachment member includes a bent portion deformed in the width direction of the vehicle for the pedal support member to turn aside from the driver's lower extremities when the pedal support member moves backward due to a load applied to the partition member from the front of the vehicle.

5. The vehicle pedal displacement control structure according to claim 4, wherein at least two attachment members are provided and spaced apart from each other vertically, the attachment member in a higher position having lower supporting rigidity for supporting the pedal support member than that in a lower position.

6. The vehicle pedal displacement control structure according to claim 1, wherein the attachment member includes a center portion connecting to the pedal support member, a first supporting portion provided on said one side in the width direction and connecting to the partition member, and a second supporting portion provided on said other side in the width direction of the center portion and connecting to the partition member, and wherein the strength of the first supporting portion is lower than that of the second supporting portion.

7. The vehicle pedal displacement control structure according to claim 6, wherein the first supporting portion includes a first bent portion extending from the center portion, and a first flange extending from the first bent portion and connecting to the partition member, and the second supporting portion includes a second flange extending from the center portion in a direction opposite to the extension direction of said first bent portion in the width direction and connecting to the partition member.

8. The vehicle pedal displacement control structure according to claim 7, further comprising a rib provided on the second flange and extending backward.

9. The vehicle pedal displacement control structure according to claim 1, wherein the attachment member includes upper and lower connecting joints connecting to the pedal support member, wherein the upper connecting joint extends backward longer than the lower connecting joint.

10. The vehicle pedal displacement control structure according to claim 1, wherein the vehicle pedal is a parking pedal for operating a parking brake and the pedal support member is guided toward the outside of the vehicle in the width direction of the vehicle when the pedal support member moves backward due to a load applied to the partition member from the front of the vehicle.

11. The vehicle pedal displacement control structure according to claim 1 wherein the protrusion is fastened to the pedal support member and has a substantially triangular configuration in operational top plan view.

12. The vehicle pedal displacement control structure according to claim 11 wherein said protrusion has a rearward end that is rounded.

13. The vehicle pedal displacement control structure according to claim 11 wherein said protrusion has a rearward end that is positioned offset in the width direction relative to a central vertical plane bisecting the pedal support member.

14. The vehicle pedal displacement control structure according to claim 1 wherein the lower strength portion falls between, in the width direction, a central vertical plane bisecting the pedal support member and a free end of the slide member that is farthest out in the slide direction.

15. The vehicle pedal displacement control structure according to claim 1 wherein said attachment member is fastened with a fastener to the pedal support member.

16. The vehicle pedal displacement control structure according to claim 15 wherein the fastener is a weld.

17. A vehicle pedal displacement control structure having a partition member as a portion of a vehicle body and a reinforcement member for supporting rigidity of a steering system to a vehicle, the reinforcement member being arranged in a vehicle compartment rearward of the partition member, comprising:
a pedal support member for pivotally suspending a vehicle pedal;
an attachment member provided between the partition member and the pedal support member so as to attach and support the pedal support member on the partition member;
a protrusion arranged at a rear end of the pedal support member and being opposed to the reinforcement member; and
a slide member for sliding the protrusion with abutment thereon when the pedal support member moves backward, the slide member being arranged opposing to the protrusion and secured to the reinforcement member,
wherein the attachment member has a lower strength portion on one side than the other side in the width direction of the vehicle such that the attachment member buckles at the lower strength portion and the protrusion and the slide member cooperatively guide the pedal support member away from a driver in a width direction of the vehicle so as to turn aside the pedal support member from the driver's lower extremities when the pedal support member moves backward due to a load applied to the partition member from the front of the vehicle,
wherein the attachment member includes a center portion connecting to the pedal support member, a first supporting portion provided on said one side in the width direction and connecting to the partition member, and a second supporting portion provided on said other side in the width direction of the center portion and connecting to the partition member,
wherein the strength of the first supporting portion is lower than that of the second supporting portion, and wherein the first supporting portion includes a first bent portion extending from the center portion, and a first flange extending from the first bent portion and connecting to the partition member, and the second supporting portion includes a second flange extending from the center portion in a direction opposite to the extension direction of said first bent portion in the width direction and connecting to the partition member.

18. The vehicle pedal displacement control structure according to claim 17, further comprising a rib provided on the second flange and extending backward.

19. The vehicle pedal displacement control structure according to claim 17, wherein the attachment member includes upper and lower connecting joints connecting to the pedal support member, wherein the upper connecting joint extends backward longer than the lower connecting joint.

20. A vehicle pedal displacement control structure having a partition member as a portion of a vehicle body and a reinforcement member for supporting rigidity of a steering system to a vehicle, the reinforcement member being arranged in a vehicle compartment rearward of the partition member, comprising:
a pedal support member having a main body with opposing, vertically extending side walls and an upper peripheral surface and a pivot support location at which there is pivotably suspended a vehicle pedal;
an attachment member that has a first end secured to said partition member and a second end secured at a main body securement location to the main body of the pedal support member so as to attach and support the pedal support member on the partition member;
a protrusion arranged at a rear end of the pedal support member and being opposed to the reinforcement member; and
a slide member for sliding the protrusion with abutment thereon when the pedal support member moves backward, the slide member being arranged opposing to the protrusion and secured to the reinforcement member,
wherein the attachment member has a lower strength portion on one side in the width direction of the vehicle such that the attachment member buckles at the lower strength portion and the protrusion and the slide member cooperatively guide the pedal support member away from a driver in a width direction of the vehicle so as to turn aside the pedal support member from the driver's lower extremities when the pedal support member moves backward due to a load applied to the partition member from the front of the vehicle.

21. The vehicle pedal displacement control structure according to claim 20 wherein said attachment member is fastened with a fastener to the pedal support member, and said attachment member is wider in a widthwise direction than the main body so as to extend in a widthwise direction out away, respectively, from each of the vertically extending side walls.

22. A vehicle pedal displacement control structure having a partition member as a portion of a vehicle body and a reinforcement member for supporting rigidity of a steering system to a vehicle, the reinforcement member being arranged in a vehicle compartment rearward of the partition member, comprising:
- a pedal support member for pivotally suspending a vehicle pedal;
- an attachment member provided between the partition member and the pedal support member so as to attach and support the pedal support member on the partition member;
- a protrusion arranged at a rear end of the pedal support member and being opposed to the reinforcement member; and
- a slide member for sliding the protrusion with abutment thereon when the pedal support member moves backward, the slide member being arranged opposing to the protrusion and secured to the reinforcement member, wherein the attachment member has a lower strength portion on one side in the width direction of the vehicle such that the attachment member buckles at the lower strength portion and the protrusion and the slide member cooperatively guide the pedal support member away from a driver in a width direction of the vehicle so as to turn aside the pedal support member from the driver's lower extremities when the pedal support member moves backward due to a load applied to the partition member from the front of the vehicle, and wherein the pedal support and the attachment member are configured such that, during a course of cooperation between the protrusion and the slide member, a lower free end of the vehicle pedal moves, relative to a front to rear axis, only rearward in combination with the width direction movement of the pedal support.

* * * * *